Patented July 15, 1952

2,603,654

UNITED STATES PATENT OFFICE 2,603,654

POLYETHYLENE GLYCOL ESTERS OF ALPHA - (ALKYLMERCAPTO) PROPIONIC ACID

Milton Kosmin, Dayton, Ohio, assignor to Monsanto Chemical Company, St. Louis, Mo., a corporation of Delaware No Drawing. Application September 30, 1949,
Serial No. 119,006

5 Claims. (Cl. 260—481)

This invention provides new sulfur-bearing esters of propionic acid.

An object of this invention is the provision of new sulfur-bearing esters of ethylene glycol and polyethylene glycol. A further object is the preparation of new sulfur-bearing esters which have pronounced surface-active properties in aqueous solutions.

According to this invention a new chemical product is obtained by condensing with ethylene oxide an alkylmercaptopropionic acid in the proportions of from one mole to 30 moles of ethylene oxide per mole of alkylmercaptopropionic acid. The products so obtained are valuable as detergents and as lubricating oil modifiers. The products herein produced have the structure:

$$\text{RSCH}-\text{COO}(C_2H_4O)_n\text{H}$$
$$|$$
$$\text{CH}_3$$

where R is an alkyl radical having 8 to 16 carbon atoms and $n$ is an integer having a value of from 1 to 30.

The alkylmercaptopropionic acid may be prepared by condensing an alkyl mercaptan with chloropropionic acid with liberation of HCl. For practical reasons, it is desirable to first convert the mercaptan to a mercaptide by reaction with an alkali metal hydroxide or with an alcoholate and then to react this product with an alkali metal salt of chloropropionic acid. The reaction may be conducted by mixing together in molar quantities the above reactants while in water solution, allowing the reaction to take place therein and then extracting the product from the water solution with a suitable solvent. The condensation proceeds smoothly and gives good yields of the product. When α-chloropropionic acid is employed in the preferred form of my invention, a material having the formula:

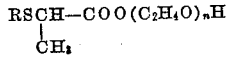

is obtained, where R is an alkyl radical having from 8 to 16 carbon atoms. R may be a primary, secondary or tertiary carbon radical; that is, the carbon atom joined to sulfur may be linked additionally to one carbon atom to two carbon atoms or to three carbon atoms, it being understood that valencies not satisfied by carbon are joined to hydrogen atoms.

Tertiary mercaptans having from 8 to 16 carbon atoms may be derived from polymer olefins by sulfhydration. Suitable polymer olefins are obtained by polymerizing lower olefins, such as propylene and butylene or mixtures thereof. The polymer olefins so obtained may be diisobutylene, triisobutylene, tetraisobutylene, tripropylene, tetrapropylene and pentapropylene. Sulfhydration of the polymer olefins may be carried out to form the mercaptan by the reaction of hydrogen sulfide with the polymer olefin in the presence of a suitable catalyst and more particularly as is described in U. S. Patent 2,392,555.

My invention is further illustrated by the following examples:

EXAMPLE 1

50.4 g. (0.184 moles) of α-(n-dodecylmercapto) propionic acid, made by the condensation of n-dodecyl mercaptan with chloropropionic acid is mixed with 1.8 g. of $K_2CO_3$ and 3.4 g. of $H_2O$. The mixture is placed in a glass flask provided with a gas disperser, stirrer and thermometer and then is heated to about 135° C. A stream of ethylene oxide gas is passed in. When the equivalent of one mole of ethylene oxide per mole of mercaptopropionic acid has combined with the acid, the stream of ethylene oxide gas is interrupted and a sample of the product removed. The product corresponds to the monoethylene glycol ester of α-(n-dodecylmercapto) propionic acid.

EXAMPLE 2

The balance of the condensation product produced in Example 1 above, is reacted with additional ethylene oxide at the same temperature until an equivalent of 5 moles of ethylene oxide per mole of mercaptopropionic acid is combined therewith. A sample of the product is removed and consists of the monopentaethylene glycol ester of α-(n-dodecylmercapto) propionic acid.

EXAMPLE 3

The balance of the condensation product produced in Example 2 above, is reacted with additional ethylene oxide at the same temperature. When the equivalent of 15 moles of ethylene oxide per mole of mercaptopropionic acid has combined in the product, the flow of gas is interrupted and the product removed. The product corresponds to the pentadecyl ethylene glycol ester of α-(n-dodecylmercapto) propionic acid.

For the production of the higher polyethylene glycol esters the reaction may be continued in the manner illustrated in the above examples. In this way the equivalent of up to 30 moles of combined ethylene oxide per mole of mercaptopropionic acid may be combined.

The product obtained in Example 3 was evaluated as a detergent in the concentrated (100% active) form and also in the built (20% active) form. The detergency evolution was conducted by the procedure described by Jay C. Harris in Soap and Sanitary Chemicals, for August and September 1943. Comparisons were made with a commercial detergent known as Gardinol (sodium lauryl sulfate) in the same concentration and under the same conditions. The results of this comparison are expressed in the table below as relative detergency values. The results obtained were as follows:

*Relative detergency, percent*

|  | "100% Active" Form | | "Built" Form | |
|---|---|---|---|---|
| Water Hardness, p. p. m. | 50 | 300 | 50 | 300 |
| Product of Ex. 3 percent | 110 | 124 | 116 | 124 |

The built form of detergent product employed above was prepared by combining 20 parts of the product of Example 3 with 40 parts of tetrasodium pyrophosphate and 40 parts of starch. However, other salts in various proportions may also be employed for the same purpose. Suitable salts are: sodium sulfate, sodium carbonate, sodium bicarbonate, sodium sesquicarbonate, trisodium phosphate, sodium tripolyphosphate, disodium orthophosphate, sodium silicate, etc. For most detergent purposes, from 0.5% to 5% by weight of carboxy methyl cellulose may be incorporated in the built detergent and improved results obtained. The active ingredient may comprise from 15% to 50% by weight of the detergent.

What I claim is:

1. Products corresponding to the formula:

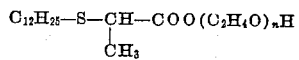

where $n$ is an integer having a value of from 1 to 30.

2. Products corresponding to the formula:

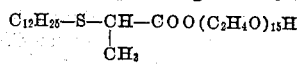

3. Polyethylene glycol esters of α-(tert. alkylmercapto) propionic acid, the alkyl group of which contains from 8 to 16 carbon atoms.

4. The process which comprises condensing ethylene oxide with an α-(alkylmercapto) propionic acid until from 1 to 30 moles of ethylene oxide have combined per mole of said mercaptopropionic acid.

5. The process which comprises condensing ethylene oxide with α-(dodecylmercapto) propionic acid until on the order of from 1 to 30 moles of ethylene oxide have combined per one mole of said mercaptopropionic acid.

MILTON KOSMIN.

No references cited.